US008810610B2

(12) United States Patent
Hong et al.

(10) Patent No.: US 8,810,610 B2
(45) Date of Patent: Aug. 19, 2014

(54) STEREOSCOPIC IMAGE DISPLAY AND POWER CONTROL METHOD THEREOF (75) Inventors: Youngjun Hong, Gyeonggi-do (KR); Kyoungdon Woo, Gyeonggi-do (KR); Taegung Kim, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 210 days.

(21) Appl. No.: 13/289,475

(22) Filed: Nov. 4, 2011

(65) Prior Publication Data

US 2012/0113161 A1   May 10, 2012

(30) Foreign Application Priority Data

Nov. 5, 2010 (KR) .......................... 10-2010-0109830

(51) Int. Cl.
*G09G 5/02* (2006.01)

(52) U.S. Cl.
USPC .............. 345/690; 345/211; 345/208; 348/51

(58) Field of Classification Search
CPC .................................. G09G 3/36; G09G 5/10
USPC ............. 345/99, 87, 204, 690, 208, 210, 211; 359/376, 458, 462–477
See application file for complete search history.

(56) References Cited

U.S. PATENT DOCUMENTS

| 7,969,406 | B2 * | 6/2011 | Park ............................... 345/102 |
| 8,421,723 | B2 * | 4/2013 | Ijzerman ......................... 345/87 |
| 2008/0100600 | A1 * | 5/2008 | Hsueh ............................ 345/204 |
| 2008/0158234 | A1 * | 7/2008 | Kim ................................ 345/501 |
| 2008/0180422 | A1 * | 7/2008 | Kusafuka et al. .............. 345/204 |
| 2010/0033461 | A1 | 2/2010 | Hasegawa et al. |
| 2011/0090319 | A1 * | 4/2011 | Kim et al. ...................... 348/51 |

FOREIGN PATENT DOCUMENTS

CN    101646096 A    2/2010

OTHER PUBLICATIONS

First Notification of Office Action dated Dec. 3, 2013 from The State Intellectual Property Office of China in counterpart application 201110343676.7.

* cited by examiner

*Primary Examiner* — Waseem Moorad
*Assistant Examiner* — Sujit Shah
(74) *Attorney, Agent, or Firm* — Morgan, Lewis & Bockius LLP (57) ABSTRACT

The present invention relates to a stereoscopic image display and a power control method thereof, including a timing controller which varies a driving circuit supply voltage between a first voltage and a third voltage in a 3D mode for displaying a 3D image on a display panel by controlling a power supply circuit and controls the driving circuit supply voltage as a second voltage in a 2D mode for displaying a 2D image on the display panel. The second voltage is lower than the first voltage and is higher than the third voltage.

10 Claims, 7 Drawing Sheets

|  | related art | present invention | power consumption reduction ratio |
|---|---|---|---|
| 2D mode | 8.05W | 4.94 | 38% |
| 3D mode | 4.61W | 4.24 | 8% |

STEREOSCOPIC IMAGE DISPLAY AND POWER CONTROL METHOD THEREOF

This application claims the benefit of Korea Patent Application No. 10-2010-0109830 filed on Nov. 5, 2010, the entire contents of which is incorporated herein by reference for all purposes as if fully set forth herein.

BACKGROUND

1. Field

The present invention relates to a stereoscopic image display and a power control method thereof which lower a driving circuit supply voltage in a 2D mode and vary the driving circuit supply voltage in a 3D mode.

2. Related Art

A stereoscopic image display may be classified into a stereoscopic technique and an autostereoscopic technique.

The stereoscopic technique is implemented using parallax images of left and right eyes. The stereoscopic technique is classified into a glasses method and a non-glasses method. The glasses method displays left and right parallax images on a direct-view display or projector in a time-divisional manner by changing polarization direction of the left and right parallax images, and implements a stereoscopic image using polarization glasses or liquid-crystal shutter glasses. In general, the non-glasses method is a method which obtains a stereoscopic image by separating the optical axes of left and right parallax images using an optical plate such as a parallax barrier, a lenticular lens, and the like.

The stereoscopic image display displays a 2D image in a 2D mode and a 3D image in a 3D mode. A driving circuit of the stereoscopic image display includes a data drive circuit for supplying a data voltage (or current) to data lines of a display panel, a scan drive circuit for supplying scan pulses to scan lines of the display panel, a timing controller for synchronizing the operational timing of the data drive circuit and the scan drive circuit, a power supply circuit for generating the driving power of the data drive circuit and the scan drive circuit. The power supply circuit supplies a DC driving circuit supply voltage to the data drive circuit and the scan drive circuit to drive the data drive circuit and the scan drive circuit when the power is applied to the stereoscopic image display. The output voltages of the data drive circuit and the scan drive circuit can be boosted by boosting the voltage level of the DC driving circuit supply voltage. The DC driving circuit supply voltage is generally constant in the 2D mode and the 3D mode.

When a black data are inserted between a left-eye image frame and a right-eye image frame in the 3D mode, the DC driving circuit supply voltage may be set as the high voltage in the 2D mode and the 3D mode to compensate the lowering of the luminance due to the black data frame. The stereoscopic image display of the related art drives the display panel drive circuit including the data drive circuit and the scan drive circuit by the high DC driving circuit supply voltage about 12V in the 2D mode and the 3D mode to compensate the lowering the luminance in the 3D mode. Accordingly, the stereoscopic image display of the related art causes the high power consumption in the display panel drive circuit in the 2D mode and the 3D mode.

SUMMARY

The present invention provides a stereoscopic image display and a power control method thereof which can reduce power consumption without lowering the picture quality and the lifetime.

The stereoscopic image display of the present invention includes: a display panel having data lines, scan lines crossing with the data lines, and pixels arranged in a matrix; a power supply circuit for generating a driving circuit supply voltage; a gamma reference voltage generation circuit which is driven by the driving circuit supply voltage to generate a gamma reference voltage; a data drive circuit which is driven by the driving circuit supply voltage, generates a data voltage by using the gamma reference voltage, and outputs the data voltage to the data lines; and a timing controller which varies the driving circuit supply voltage between a first voltage and a third voltage in a 3D mode for displaying a 3D image on the display panel by controlling the power supply circuit and controls the driving circuit supply voltage as a second voltage in a 2D mode for displaying a 2D image on the display panel. The second voltage is lower than the first voltage and is higher than the third voltage.

A method for controlling the power of the stereoscopic image display includes the steps of: varying the driving circuit supply voltage between the first voltage and the third voltage in the 3D mode in which the 3D image is displayed on the display panel by controlling the power supply circuit; and controlling the driving circuit supply voltage as the second voltage in the 2D mode in which the 2D image is displayed on the display panel.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings. Like reference numerals designate like elements throughout the specification. In the following description, when a detailed description of well-known functions or configurations related to this document is determined to unnecessarily cloud a gist of the present invention, the detailed description thereof will be omitted.

Figure 1:
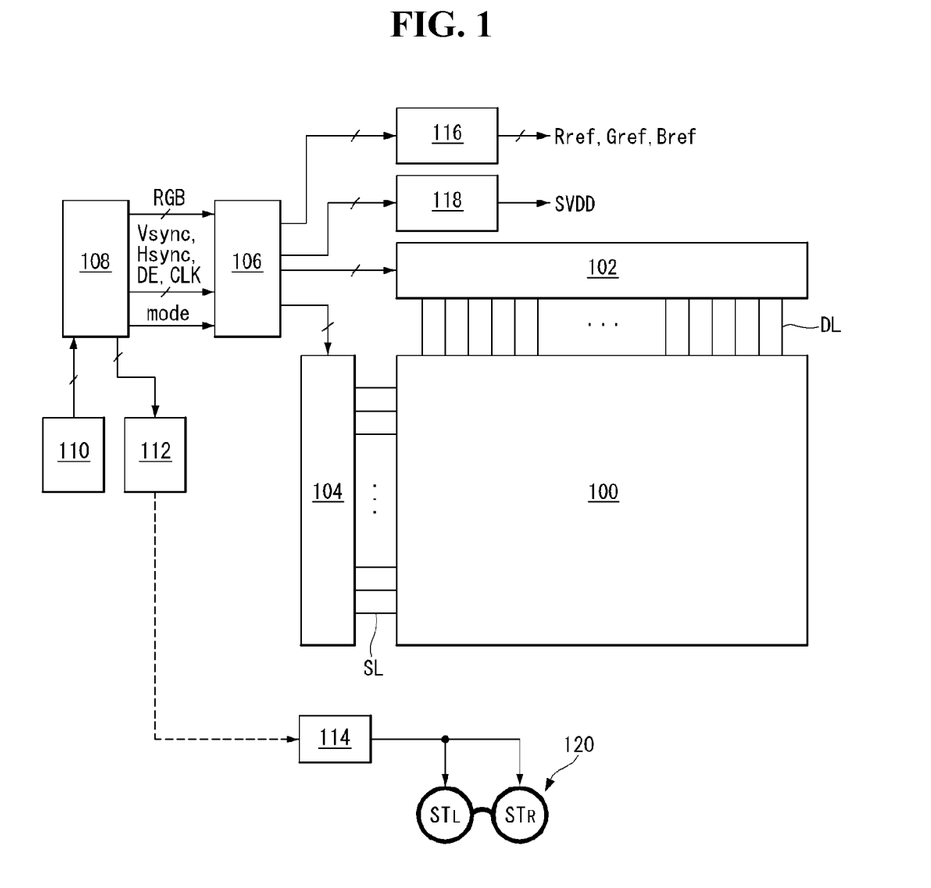
FIG. 1 is a view illustrating a stereoscopic image display according to an embodiment of the present invention.
Figure 2:
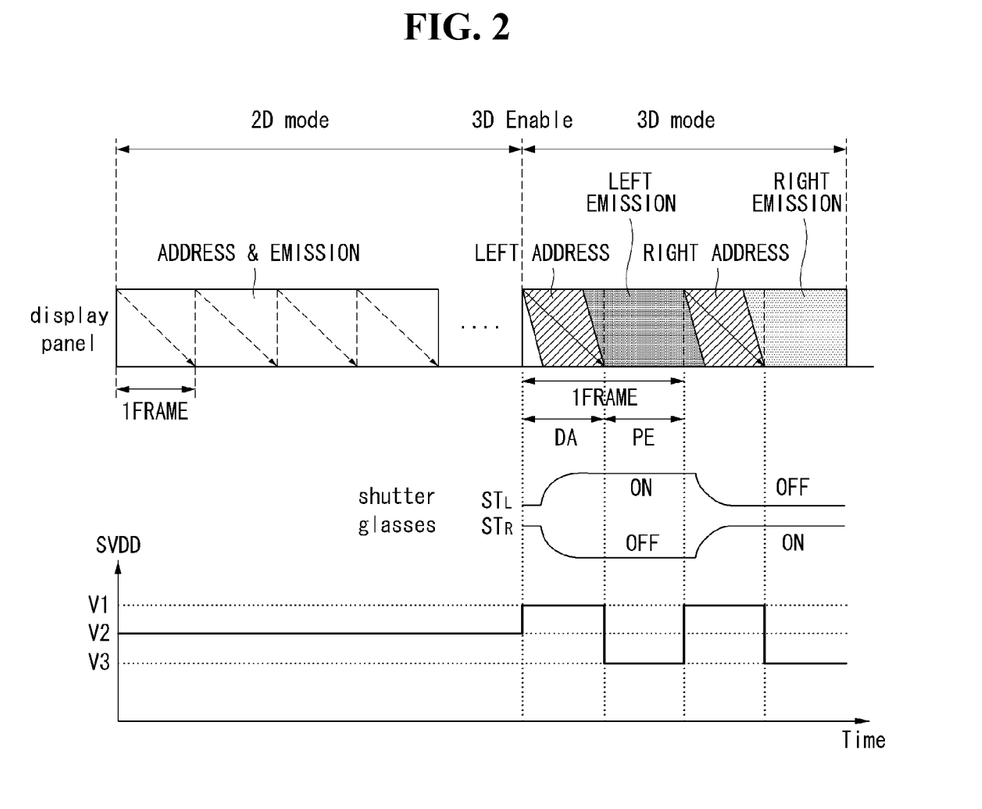
FIG. 2 is a view illustrating operations of a display panel in a 2D mode and a 3D mode and a driving circuit supply voltage in a stereoscopic image display according to an embodiment of the present invention.

Referring to FIGS. 1 and 2, a stereoscopic image display according to an embodiment of the present invention includes a display panel 100, a display panel drive circuit, a control circuit, and the like.

Figure 3:
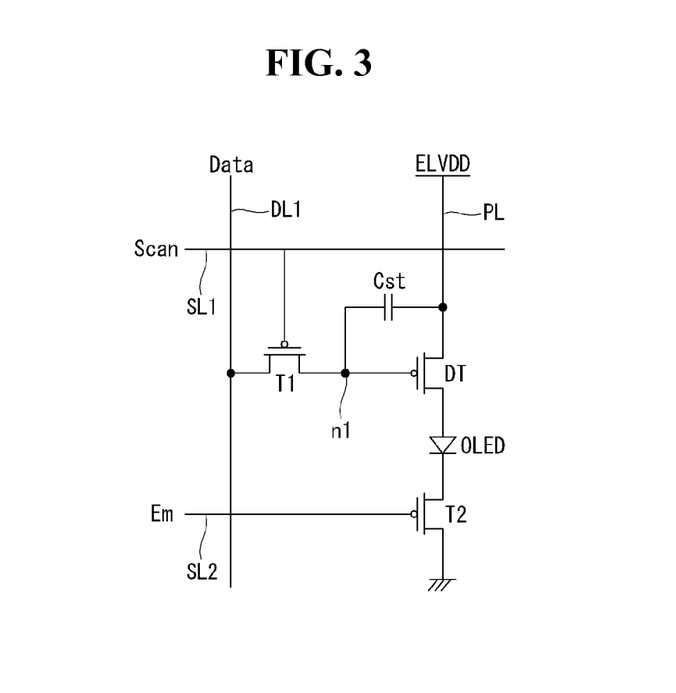
FIG. 3 is an equivalent circuit diagram illustrating a pixel according to an embodiment of the present invention.

The display panel 100 is described in an Organic Light Emitting Diode (OLED) display panel in detail. Meanwhile, the display panel 100 is not limited by the OLED display panel. The display panel 100 comprises data lines DL, scan lines SL crossing with the data lines DL, and pixels arranged in a matrix in pixel areas which are defined by the data lines DL and the scan lines SL. The display panel 100, as shown in FIG. 3, further includes a power supply line PL for supplying a pixel supply voltage ELVDD to the pixels.

The display panel writes 2D image data in all the pixels of the display panel 100 during 1 frame period in a 2D mode and then emits the light from the pixels. The display panel drive circuit divides the 1 frame period into a data address period DA and a pixel emission period (PE) and allows emitting the light from the pixels during the pixel emission period after addressing the data to the pixels effect during the data address period DA to obtain a Black Data Insertion (BDI). The control circuit can adjust the data address period DA and the pixel emission period PE by the timing of the emission control pulse EM.

The display panel drive circuit includes a power supply circuit 118, a gamma reference voltage generation circuit 116, a data drive circuit 102, and a scan drive circuit 104, and the like which drive the data lines DL and the scan lines SL to address the data to the display panel 100 and to emit the light from the pixels.

The power supply circuit 118 generates a driving circuit supply voltage SVDD for driving the display panel drive circuit such as the gamma reference voltage generation circuit 116, the data drive circuit 102, the scan drive circuit 104, and the like. Furthermore, the power supply circuit 118 generates the pixel supply voltage ELVDD to be supplied to the pixels of the display panel 100. The driving circuit supply voltage SVDD is supplied to a level shifter in the scan drive circuit 104. The level shifter of the scan drive circuit 104 converts a voltage having a swing width of 0~3.3V to a swing width of an operational voltage of a Thin Film Transistor (TFT) within the pixel.

The power supply circuit 118, as shown in FIG. 2, constantly maintains the voltage level of the driving circuit supply voltage SVDD at a second voltage V2 in the 2D mode under the control of the timing controller 106. The power supply circuit 118, as shown in FIG. 2, boosts the voltage level of the driving circuit supply voltage SVDD to the second voltage V2 during the data address period DA and lowers the voltage level of the driving circuit supply voltage SVDD to a third voltage V3 during the pixel emission period in the 3D mode under the control of the timing controller 106. Here, the first voltage V1 can be set as a voltage capable of sufficiently boosting an output voltage of the data drive circuit 102, for example the voltage of 12V. The second voltage V2 is lower than the first voltage V1 and can be set as a voltage capable of emitting the light of the normal luminance from the pixels, for example the voltage among 9V to 11V in the 2D mode. The third voltage V3 is lower than the second voltage V2 and can be set as the minimum operational voltage of the display panel drive circuit, for example the voltage of 8V.

The gamma reference voltage generation circuit 116 generates R (Red), G (Green), and B (Blue) gamma reference voltages and supplies the RGB gamma reference voltages Rref, Gref, Bref to the data drive circuit 102. The gamma reference voltage generation circuit 116 can adjust gamma reference voltages Rref, Gref, Bref of each of RGB according to the gamma data selected under the control of the timing controller 106.

Figure 4:
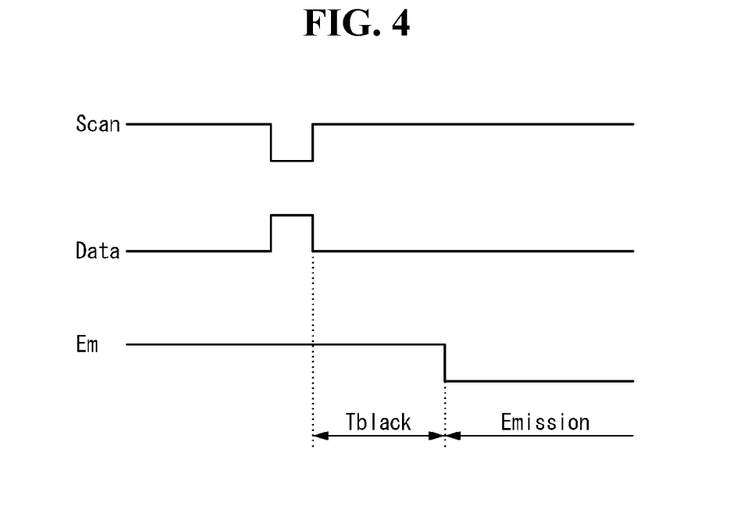
FIG. 4 is a waveform diagram showing driving signals of the pixel illustrated in FIG. 3.

The data drive circuit 102 converts digital video data RGB of 2D/3D images inputted from the timing controller 106 to a data voltage Data shown in FIG. 4 by using the RGB gamma reference voltages Rref, Gref, Bref and outputs the converted voltage to the data lines DL.

The scan drive circuit 104 supplies sequentially a scan pulse Scan synchronized with the data voltage Data shown in FIG. 4 and an emission control pulse Em for controlling the emission time of the pixels to the scan lines SL under the control of the timing controller 106. The scan lines SL are classified into scan lines of a first scan group to which the scan pulses are sequentially supplied and scan lines of a second scan group to which the emission control pulses Em are sequentially supplied. The scan drive circuit 104 includes a first shift register for sequentially supplying the scan pulses synchronized with the data voltage Data to the scan lines of the first scan group and a second shift register for sequentially supplying the emission control pulses Em to the scan lines of the second scan group. The first shifter register generates the scan pulse in response to a first start pulse of the timing controller 106. The second shift register generates the emission control pulse in response to a second start pulse of the timing controller 106.

The control circuit includes the timing controller 106, a host system 108, and the like.

The timing controller 106 supplies the digital video data RGB to the data drive circuit 102. The timing controller 106 generates the timing control signals for controlling the operational timing of the data drive circuit 102 and the scan drive circuit 104 on the basis of the timing signals inputted from the host system 108 of vertical/horizontal synchronous signals, clock signals, main clock, and the like. The timing controller 106 may be multiply a frame frequency by N times (N is an integer and is equal to or greater than 2) of an input frame frequency and can control the display panel drive circuit on the basis of the multiplied frame frequency. The input frame frequency is 50 Hz in a Phase Alternate Line (PAL) system and is 60 Hz in a National Television Standards Committee (NTSC) system.

The timing controller 106 controls the pixel emission period PE at about 100% with respect to 1 frame period by emitting the light from the pixels immediately after the data addresses of the pixels in the 2D mode. The timing controller 106 controls the pixel emission period PE at about 50% with respect to 1 frame period by controlling the data drive circuit 102 and the scan drive circuit 104 to emit the light from the pixels from a time point about ½ of 1 frame period after the data addresses of the pixels in the 3D mode.

The timing controller 106 can adjust the voltage levels of the RGB gamma reference voltages Rref, Gref, Bref by controlling the gamma reference voltage generation circuit. In addition, the timing controller 106 controls the driving circuit supply voltage SVDD outputted from the power supply circuit 118 in the 2D mode by the DC voltage of the second voltage V2 and controls the driving circuit supply voltage SVDD in the 3D mode by the AC voltage swung between the first voltage V1 and the third voltage V3 as shown in FIG. 2.

The host system 108 converts the resolution of the image data resolution according to the resolution of the display panel 100 by using a scaler with respect to data of an input image inputted from an external device which is not illustrated or a broadcasting reception circuit. The host system 108 transmits the timing signals together with the digital video data outputted from the scaler to the timing controller 106. The host system 108 can transmit a mode signal for separating the 2D mode and the 3D mode to the timing controller 106.

The host system 108 is connected to a user input unit 110. The user can select the 2D mode and the 3D mode through the user input unit 110. The user input unit 110 includes a touch screen attached on or built in the display panel 100, an On Screen Display (OSD), a keyboard, a mouse, a remote controller, and the like. The host system 108 switches the current operational mode to the 2D mode or the 3D mode in response to the user data inputted through the user input unit 110 or can switch the operational mode on the basis of the analyzed result of the input result.

The stereoscopic image display device of the present invention includes shutter glasses 120.

The shutter glasses 120 include a left-eye shutter STL and a right-eye shutter STR which are electrically controlled. Each of the left-eye shutter STL and the right-eye shutter STR includes a first transparent substrate, a first transparent electrode formed on the first transparent substrate, a second transparent substrate, a second transparent electrode formed on the second transparent substrate, a liquid crystal layer formed between the first and second transparent substrates, and the like. The reference voltage is supplied to the first transparent electrode and the ON/OFF voltage is supplied to the second transparent electrode. Each of the left-eye shutter STL and the right-eye shutter STR transmits the incident light from the display panel when the ON voltage is supplied to the second transparent electrode. In addition, each of the left-eye shutter STL and the right-eye shutter STR shields the incident light from the display panel 100 when the OFF voltage is supplied to the second transparent electrode. The left-eye shutter STL of the shutter glasses 120, as shown in FIG. 2, is opened in synchronization with the left-eye image displayed on the display panel 100 under the control of the host system 108 and is closed to shield the light when the right-eye image is displayed on the display panel 100. The right-eye shutter STR of the shutter glasses 120, as shown in FIG. 2, is opened in synchronization with the right-eye image displayed on the display panel 100 under the control of the host system 108 and is closed to shield the light when the left-eye image is displayed on the display panel 100.

The host system 108 is connected to a shutter control signal transmission part 112. The shutter control signal transmission part 112 transmits a shutter control signal for opening and closing the left-eye shutter STL and the right-eye shutter STR through a wire/wireless interface to a shutter control signal reception part 114 under the control of the host system 108. The shutter control signal reception part 114 may be built in the shutter glasses 120. The shutter control signal reception part 114 receives the shutter control signal through the wire/wireless interface and alternately opens or closes the left-eye shutter STL and the right-eye shutter STR of the shutter glasses 120 in response to the shutter control signal.

The shutter glasses 120 can be replaced by an active retarder and polarization glasses. The active retarder is attached on the display panel 100. The active retarder differently varies the polarization directions of the left-eye image and the right-eye image by using an electrically controlled birefringent medium. The polarization glasses include a left-eye polarization filter for transmitting only the polarization of the left-eye image and a right-eye polarization filter for transmitting only the polarization of the right-eye image.

The stereoscopic image display device of the present invention applies the data voltage to the pixels by boosting the driving circuit supply voltage SVDD to the first voltage V1 during the data address period DA in the 3D mode shown in FIG. 2. In addition, the stereoscopic image display device of the present invention lowers the driving circuit supply voltage SVDD to the third voltage V3 during the pixel emission period PE in the 3D mode. At this time, the power consumption of the display panel drive circuit is minimized.

The pixels of the display panel 100 maintain the emission during the pixel emission period using the voltage charged in the data address period DA in the 3D mode. As the pixels emit the light by the precharged data voltage without being dependent on the data voltage outputted from the data drive circuit 102 during the pixel emission period PE of the 3D mode. Therefore, the data drive circuit 102 and the gamma reference voltage generation circuit 116 need not generate the outputs during the pixel emission period PE of the 3D mode. Accordingly, as the data drive circuit 102 and the gamma reference voltage generation circuit 116 are driven by the minimum driving circuit supply voltage SVDD during the pixel emission period PE of the 3D mode and do not generate the outputs, the power consumption is not almost generated.

FIG. 3 is an equivalent circuit diagram showing the pixels according to an embodiment of the present invention. FIG. 4 is a waveform diagram showing the driving signals of the pixels illustrated in FIG. 3. FIGS. 3 and 4 show examples of the pixels and the driving signals of the present invention. The pixels and the driving signals thereof are not limited in FIGS. 3 and 4 and can be modified to any thing which can operated in the data address period DA and the pixel emission period PE.

Referring to FIGS. 3 and 4, each of the pixels includes an Organic Light Emitting Diode (OLED), a first switch TFT T1, a second switch TFT T2, a driving TFT DT, a storage capacitor Cstg, and the like.

The pixels commonly receive supply voltages such as a pixel supply voltage ELVDD, a ground voltage (or a low potential supply voltage, GND), and the like. The TFTs T1, T2, DT can be formed with p type Metal Oxide Semiconductor (MOS) TFTs.

The scan pulses synchronized with the data voltage Data are sequentially supplied to scan lines SL1 of the first scan group during the data address period DA. The first switch TFT T1 supplies the data voltage to the gate electrode of the driving TFT DT connected to a first node n1 and a storage capacitor Cst in response to the scan pulses Scan supplied to the scan lines SL1 of the first scan group. A drain electrode of the first switch TFT T1 is connected to the first node n1 and a source electrode thereof is connected to the data line DL1. A gate electrode of the first switch TFT T1 is connected to the scan lines SL1 of the first scan group.

The OLED emits the light when a current path is formed between the cathode electrode of the OLED and a ground voltage source (GND) while the emission control pulse Em maintains the low logic. The emission control pulses Em are sequentially supplied to the scan lines of the second scan group in line units or block units during the pixel emission period PE. The second switch TFT T2 is turned on in response to the emission control pulses Em supplied to the scan lines SL2 of the second scan group to form the current path between the cathode electrode of the OLED and the ground voltage source GND. A drain electrode of the second switch TFT T2 is connected to the ground voltage source GND and a source electrode thereof is connected to the cathode electrode of the OLED. A gate electrode of the second switch TFT T2 is connected to the scan lines SL2 of the second scan group.

The driving TFT DT adjusts the amount of current between a power supply line PL and the OLED according to a voltage of the first node n1 (or a gate voltage). A source electrode of the TFT DT is connected to the power supply line PL to which the pixel supply voltage ELVDD is supplied and a drain electrode thereof is connected to an anode electrode of the OLED. A gate electrode of the driving TFT DT is connected to the first node n1.

The storage capacitor Cstg is connected between the first node n1 and the power supply line PL. The storage capacitor Cstg samples a threshold voltage of the driving TFT DT during the data address period DA and stores the compensated data voltage as much as the threshold voltage of the driving TFT DT.

A multi-layer organic compound layer is formed between the anode electrode and the cathode electrode of the OLED. The organic compound layer includes a Hole Injection Layer (HIL), a Hole Transport Layer (HTL), an Emission Layer (EML), an Electron Transport Layer (ETL), and an Electron Injection Layer (EIL). The OLED emits the light with the brightness in proportional to the current supplied through the driving TFT DT and the second switch TFT T2. The anode electrode of the OLED is connected to the drain electrode of the driving TFT DT and the cathode electrode thereof is connected to the source electrode of the second switch TFT T2.

In FIG. 4, "Tblack" indicates the time until the emission control pulse Em is supplied to the pixels after the data voltage is supplied to the pixels. As the current is not applied to the OLEDs of the pixels during the time Tblack, the pixels display a black scale without emitting the light. The pixels emit the light when the data voltage is maintained at the storage capacitor Cst during the data address period DA. The pixels emits light when the second switch TFT T2 is turned on during the pixel emission period PE.

Figure 5:
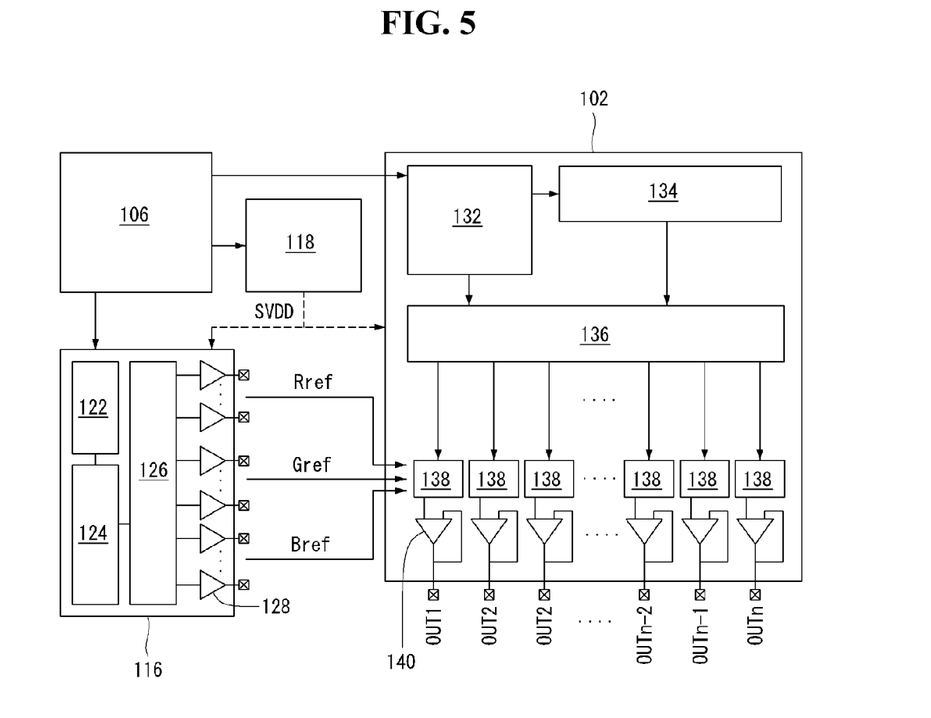
FIG. 5 is a circuit diagram showing a circuit configuration of a data drive circuit and a gamma reference voltage generation circuit illustrated in FIG. 1.

FIG. 5 is a circuit diagram showing a circuit configuration of the data drive circuit 102 and the gamma reference voltage generation circuit 116 illustrated in FIG. 1.

Referring to FIG. 5, the data drive circuit 102 includes one or more source drive Integrated Circuits (hereinafter ICs). Each of the source drive ICs includes a serial to parallel converter 132, a shift register 134, a 2-line latch 136, a digital to analog converter (hereinafter DAC) 138, an output buffer 140, and the like.

The serial to parallel converter 132 converts RGB digital video data received from the timing controller 106 to parallel data. The shift register 134 outputs a sampling clock by shifting a start pulse received from the timing controller 106 according to a shift clock. The 2-line latch 136 samples the data from the serial to parallel converter 132 according to sampling clocks and simultaneously outputs the sampled 1-line data. The DAC 138 converts the data received from the 2-line latch 136 to the data voltage to be charged in the pixels by using RGB gamma reference voltages Rref, Gref, Bref. The output buffer 140 minimizes the signal attenuation of the data voltage to be supplied to the data lines DL. The driving circuit supply voltage SVDD is inputted as the power of the output buffer 140. The output voltage of the output buffer 140 is increased according to the increase of the driving circuit supply voltage SVDD.

The gamma reference voltage generation circuit 116 includes an interface 122, a memory 124, a DAC 126, an output buffer 128, and the like. The interface 122 supplies a gamma control signal received from the timing controller 106 in a $I^2C$ communication interface standard to the memory 124. The memory 124 selects the prestored digital gamma data in response to the gamma control signal and supplies the selected digital gamma data to the DAC 126. The DAC 126 outputs the RGB gamma reference voltages Rref, Gref, Bref according to the selected gamma reference voltages Rref, Gref, Bref. The timing controller 106 can adjust the gamma reference voltages Rref, Gref, Bref with respect to each of the RGB by using the control signal to be transmitted to the $I^2C$ communication. The driving circuit supply voltage SVDD is inputted as a voltage divider circuit supply voltage within the DAC 126. In addition, the driving circuit supply voltage SVDD is inputted as the supply voltage of the output buffer 128. The output voltage of the gamma reference voltage generation circuit 116 is boosted when the supply voltages of the voltage divider circuit and the output buffer 128 run high.

The power supply circuit 118 may be implemented by a booster converter when the voltage of the input power supplied from a power supplier on a main board of the host system 108 is lower than the driving circuit supply voltage SVDD. The power supply circuit 118 may be implemented by a buck converter when the voltage of the input power VIN is higher than the driving circuit supply voltage SVDD.

Figure 6:
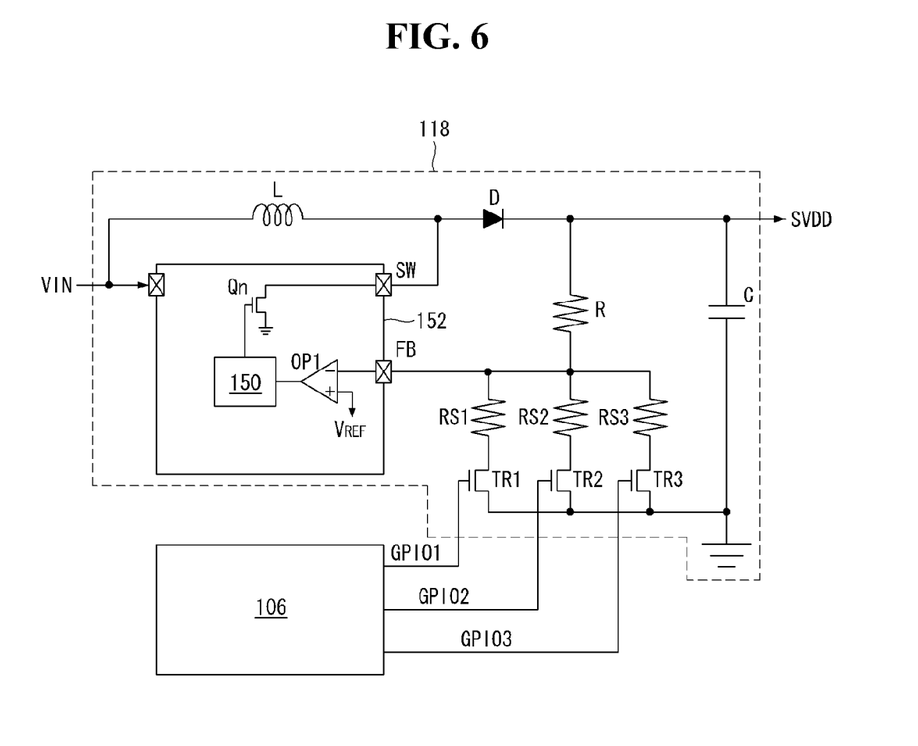
FIG. 6 is a circuit diagram showing a circuit configuration of a power supply circuit illustrated in FIGS. 1 and 5.

FIG. 6 is a circuit diagram showing a circuit configuration of the power supply circuit 118 in detail when the power supply circuit 118 is formed by the booster converter.

Referring to FIG. 6, the power supply circuit 118 includes an inductor L, a diode D, a capacitor C, a power IC 152, a plurality of resistors R, RS1, RS2, RS3, a plurality of transistors TR1, TR2, TR3, and the like.

The inductor L and the capacitor C are composed of low-pass filters to remove the high frequency noise of the driving circuit supply voltage SVDD. The diode D blocks the counter electromotive force applied to the power input terminal.

The power IC 152 includes a comparator OP1, a power controller 150, a transistor Qn, and the like. The comparator OP1 compares a feedback voltage inputted through the feedback terminal FB with the reference voltage VREF and supplies the compared result to the power controller 150. The power controller 150 adjusts a duty of a Pulse Width Modulation (PWM) control signal applied to a gate electrode of the transistor Qn according to an output signal of the comparator OP1. The transistor Qn adjusts the driving circuit supply voltage SVDD by switching the current path between a switch terminal SW and the ground voltage source GND in response to the PWM control signal inputted from the power controller 150. A gate electrode of the transistor Qn is connected to a PWM output terminal of the power controller 150 and a drain electrode thereof is connected to the switch terminal SW. A source electrode of the transistor Qn is connected to the ground voltage source GND.

The resistors R, RS1, RS2, RS3 include a feedback reference resistor R connected to an output terminal of the power supply circuit 118 and a plurality of voltage selection resistors RS1, RS2, RS3 connected in parallel to the feedback reference resistor R. The resistors R, RS1, RS2, RS3 are composed of the voltage divider circuit connected between the output terminal of the power supply circuit 118 and a feedback terminal FB of a power IC 152. The voltage divider circuit divides the feedback voltage of the driving circuit supply voltage by a resistance ratio R/RSX and supplies the divided voltage the feedback terminal FB of the power IC 152. Here, RSX can be determined as any one selected among RS1, RS2, and RS3 selected from the timing controller 106 and the transistors TR1, TR2, TR3. The RS1, RS2, and RS3 have different resistance values to vary the driving circuit supply voltage SVDD to the kind of AC in the 3D mode.

The transistors TR1, TR2, TR3 include the first transistor TR1 connected to the first voltage selection resistor RS1, the second transistor TR2 connected to the second voltage selection resistor RS2, and the third transistor TR3 connected to the third voltage selection resistor RS3. The transistors TR1, TR2, TR3 can be built in the power IC 152. The transistors TR1, TR2, TR3 select the resistance values of the voltage divider circuit for outputting the feedback voltage in response to voltage selection control signals GPIO1, GPIO2, GPIO3 of the timing controller 106. A gate electrode of the first transistor TR1 is connected to the first voltage selection terminal and a drain electrode thereof is connected to the first voltage selection resistor RS1. A gate electrode of the second transistor TR2 is connected to the second voltage selection terminal of the timing controller 106 and a drain electrode thereof is connected to the second voltage selection resistor RS2. A gate electrode of the third transistor TR3 is connected to the third voltage selection terminal of the timing controller 106 and a drain electrode thereof is connected to the third voltage selection resistor RS3. The source electrodes of the transistors TR1, TR2, TR3 are connected to the ground voltage source GND.

The voltage level of the driving circuit supply voltage SVDD outputted from the power supply circuit 118 shown in FIG. 6 can be adjusted according to a resistance ratio of the voltage divider circuit such as the following formula (1). The timing controller 106 can control the driving circuit supply voltage SVDD as shown in FIG. 2 by adjusting the resistance ratio of the voltage divider circuit using the voltage selection control signals GPIO1, GPIO2, GPIO3. For example, when the first voltage selection control signal GPIO1 is generated as high logic HIGH and the other voltage selection control signals GPIO2, GPIO3 are generated as low logic LOW and the driving circuit supply voltage SVDD can be generated as the first voltage V1. When the second voltage selection control signal GPIO2 is generated as high logic HIGH and the other voltage selection control signals GPIO1 and GPIO3 are generated as low logic LOW, the driving circuit supply voltage VDD can be generated as the second voltage V2. When the third voltage selection control signal GPIO3 is generated as high logic HIGH and the other voltage selection control signals GPIO1 and GPIO2 are generated as low logic LOW, the driving circuit supply voltage SVDD can be generated as the third voltage V3.

$$SVDD = V_{REF} \times \left(1 + \frac{R}{RSX}\right) \quad \text{formula (1)}$$

Figure 7:
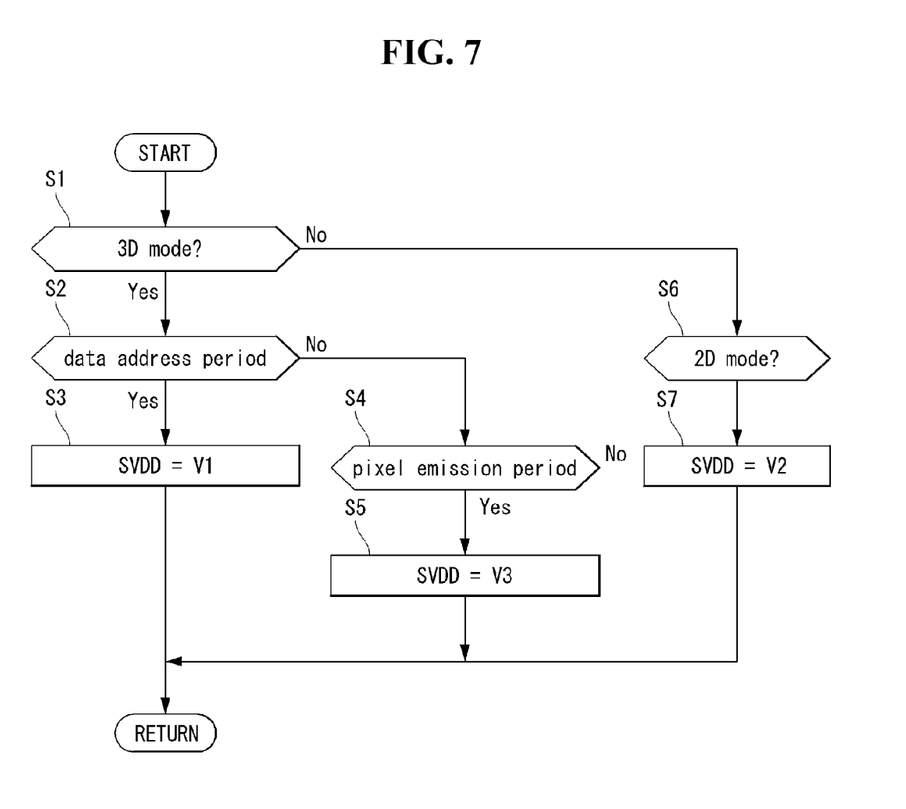
FIG. 7 is a flow chart showing a method for controlling power of a stereoscopic image display according to an embodiment of the present invention.

FIG. 7 is a flow chart showing a method for controlling power of a stereoscopic image display according to an embodiment of the present invention.

Referring to FIG. 7, the method for controlling the power of the present invention boosts the driving circuit supply voltage SVDD to the first voltage V1 during the data address period DA in the 3D mode (S1-S3). The method for controlling the power of the present invention lowers the driving circuit voltage SVDD to the third voltage V3 during the pixel emission period PE in the 3D mode S1, S2, S4, S5. The method for controlling the power of the present invention can reduce the power consumption of the display panel drive circuit without lowering the picture quality and the lifetime by minimizing the driving circuit supply voltage SVDD during the pixel emission period in which the pixels emit the light by the precharged data voltage in the 3D mode.

The method for controlling the power of the present invention constantly maintains the driving circuit supply voltage SVDD as the second voltage V2 in the 2D mode S1, S6, S7.

Figure 8:
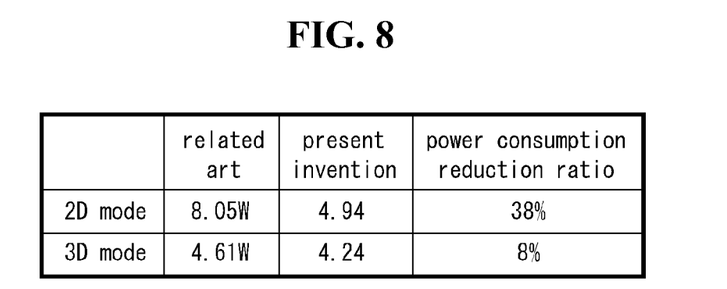
FIG. 8 is a view showing a result of a power consumption experiment of the present invention.

The inventors of the present application have performed the experiment for the power consumption of the data drive circuit 102 and the gamma reference voltage generation circuit 116 by comparing the present invention with the related art to verify the effects of the present invention. In the experiment, the OLED display panel is driven in the 2D mode and the 3D mode to measure the power consumption by using 8 source drive ICs of the data drive circuit 102 and 2 ICs of the gamma reference voltage generation circuit 116. Consequently, as shown in FIG. 8, the present invention reduces the total power consumption of the data drive circuit 102 and the gamma reference voltage generation circuit 116 about 38% in the 2D mode and about 8% in the 3D mode in comparison with the related art.

As described above, the present invention can reduce the power consumption without lowering the picture quality and the lifetime of the stereoscopic image display by lowering the driving circuit supply voltage of the stereoscopic image display in the 2D mode and varying the driving circuit supply voltage of the stereoscopic image display in the 3D mode.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A stereoscopic image display, comprising:
a display panel having data lines, scan lines crossing with the data lines, and pixels arranged in a matrix;
a power supply circuit for generating a driving circuit supply voltage;
a gamma reference voltage generation circuit which is driven by the driving circuit supply voltage to generate a gamma reference voltage;
a data drive circuit which is driven by the driving circuit supply voltage, generates a data voltage by using the gamma reference voltage, and outputs the data voltage to the data lines; and
a timing controller which alternates the driving circuit supply voltage between a first voltage and a third voltage in a 3D mode for displaying a 3D image on the display panel by controlling the power supply circuit and controls the driving circuit supply voltage as a second voltage in a 2D mode for displaying a 2D image on the display panel, wherein the second voltage is a DC voltage lower than the first voltage and higher than the third voltage,
wherein the timing controller constantly maintains the driving circuit supply voltage as the second voltage in the 2D mode, and
wherein the third voltage is a minimum operational voltage of the data drive circuit, and the second voltage is non-zero.

2. The stereoscopic image display of claim 1, wherein the timing controller controls the driving circuit supply voltage as the first voltage during a data address period for applying the data voltage to the pixels in the 3D mode and lowers the driving circuit supply voltage to the third voltage during a pixel emission period in which the pixels emit the light in the 3D mode.

3. The stereoscopic image display of claim 1, wherein the power supply circuit comprises:
a voltage divider circuit connected to an output terminal to which the driving circuit supply voltage is outputted;

a plurality of transistors for changing a resistance value of the voltage divider circuit under the control of the timing controller; and a power IC for switching an input voltage by comparing a feedback voltage inputted through the voltage divider with the reference voltage.

4. The stereoscopic image display of claim 3, wherein the voltage divider circuit comprises:

a feedback reference resistor connected to an output terminal of the power supply circuit; and a first voltage selection resistor, a second voltage selection resistor, and a third voltage selection resistor which are connected in parallel to the feedback reference resistor, the resistance values of the voltage selection resistances being different from each other.

5. The stereoscopic image display of claim 4, wherein the timing controller supplies a first voltage selection control signal for selecting the first voltage, a second voltage selection control signal for selecting the second voltage, and a third voltage selection control signal for selecting the third voltage to control terminals of the power supply circuit, the transistors comprises:

a first transistor for connecting the first voltage selection resistor to a ground voltage source in response to the first voltage selection control signal;

a second transistor for connecting the second voltage selection resistor to the ground voltage source in response to the second voltage selection control signal; and a third transistor for connecting the third voltage selection resistor to the ground voltage source in response to the third voltage selection control signal.

6. A method for controlling power of a stereoscopic image display comprising a display panel having pixels and data lines, a power supply circuit for generating a driving circuit supply voltage, a gamma reference voltage generation circuit driven by the driving circuit supply voltage to generate a gamma reference voltage, and a data drive circuit driven by the driving circuit supply voltage to generate a data voltage using the gamma reference voltage and to output the data voltage to the data lines, the method comprising:

(a) alternating the driving circuit supply voltage between the first voltage and the third voltage in the 3D mode in which the 3D image is displayed on the display panel by controlling the power supply circuit, wherein the third voltage is a minimum operational voltage of the data drive circuit; and (b) controlling the driving circuit supply voltage as the second voltage in the 2D mode in which the 2D image is displayed on the display panel, wherein the second voltage is a non-zero DC voltage lower than the first voltage and higher than the third voltage, and wherein the driving circuit supply voltage is constantly maintained as the second voltage in the 2D mode in (b).

7. The method for controlling the power of the stereoscopic image display of claim 6, wherein (a) further comprises:

controlling the driving circuit supply voltage as the first voltage during the data address period in which the data voltage is applied to the pixels in the 3D mode; and lowering the driving circuit supply voltage to the third voltage during the pixel emission period in which the pixels emit the light in the 3D mode.

8. The method for controlling the power of the stereoscopic image display of claim 7, wherein (a) further comprises varying the supply voltage by varying the resistance value of the voltage divider circuit formed within the power supply circuit.

9. The stereoscopic image display of claim 1, wherein the first, second, and third voltages are positive, and wherein the second voltage is a voltage capable of emitting light of normal luminance from the pixels.

10. The method for controlling the power of the stereoscopic image display of claim 6, wherein the first, second, and third voltages are positive, and wherein the second voltage is a voltage capable of emitting light of normal luminance from the pixels.

* * * * *